(12) United States Patent
Spiro

(10) Patent No.: US 12,266,968 B1
(45) Date of Patent: Apr. 1, 2025

(54) SELF-POWERED TESTING AND ALERTING MODULE FOR A REMOTELY POWERED EGRESS LIGHT SOURCE

(71) Applicant: Exposure Illumination Architects, Inc., Scottsdale, AZ (US)

(72) Inventor: Daniel S. Spiro, Scottsdale, AZ (US)

(73) Assignee: EXPOSURE ILLUMINATION ARCHITECTS, INC., Scottsdale, AZ (US)

( * ) Notice: Subject to any disclaimer, the term of this patent is extended or adjusted under 35 U.S.C. 154(b) by 0 days.

(21) Appl. No.: 18/826,207

(22) Filed: Sep. 6, 2024

Related U.S. Application Data

(60) Provisional application No. 63/668,836, filed on Jul. 9, 2024.

(51) Int. Cl.
*H02J 9/02* (2006.01)
*F21S 9/02* (2006.01)
*F21S 9/03* (2006.01)

(52) U.S. Cl.
CPC ............... *H02J 9/02* (2013.01); *F21S 9/022* (2013.01); *F21S 9/03* (2013.01)

(58) Field of Classification Search
CPC .................. F21S 9/02–046; H02J 9/00–065
See application file for complete search history.

(56) References Cited

U.S. PATENT DOCUMENTS 9,408,268 B2 * 8/2016 Recker .................... H02J 50/40

* cited by examiner

*Primary Examiner* — Jason M Han
(74) *Attorney, Agent, or Firm* — XSENSUS LLP

(57) ABSTRACT

A self-powered testing and alerting module for an egress light source that is coupled to an ambient lighting luminaire or mounted in the vicinity of the ambient lighting luminaire wherein both the egress and the ambient light sources are configured to receive their power from different remote power sources.

20 Claims, 9 Drawing Sheets

SELF-POWERED TESTING AND ALERTING MODULE FOR A REMOTELY POWERED EGRESS LIGHT SOURCE

CROSS-REFERENCE TO RELATED APPLICATIONS

The present patent application claims the benefit of the earlier filing date of U.S. provisional application 63/668, 836, filed Jul. 9, 2024, and contains subject matter related to that disclosed in U.S. patent application Ser. No. 18/653, 762, filed May 2, 2024, as well as U.S. patent application Ser. No. 18/436,081, filed Feb. 8, 2024, the entire contents of each of which being incorporated herein by reference.

BACKGROUND

Technical Field

The present disclosure relates to building egress lighting systems, apparatuses, methods, and computer program product, especially systems with disparate power sources.

Discussion of Background

Egress lighting luminaires are configured to illuminate the path in a building leading to the building's exterior door/s. The luminaires are typically placed overhead and are spaced apart to form a continuous illuminated path on the floor. The path is referred to as the building's legal path of egress. The egress light source luminaire can be a stand-alone luminaire, coupled to an egress sign, or incorporated with an ambient lighting luminaire.

Modern egress light sources are commonly powered by either an integral power supply that receives line power or by a remote power source such as an inverter, a generator, geothermal power, a hydrogen engine, and/or other power source/s. As recognized by the present inventor, the integral power supply for emergency lighting is relatively short lived, costly, and requires continuous maintenance.

The integral power supply, typically a battery, is located inside the ambient luminaire (or standalone luminaire) that is ceiling mounted and thus requires special equipment and skilled labor for battery replacement. In addition, todays' egress light source commonly employs inefficient lensed optics and lamps placing greater power demands on the back-up power supply.

Advances in building technology have ushered in a new era where high powered energy efficient lamps and/or precision optical lenses control compact egress lighting sources. The new generation lamps' coupled optics can retire independent standalone luminaires and/or egress lighting luminaires incorporated with ambient lighting luminaires. At least one of such new generation egress light sources can be horizontally oriented, and can rotate about its vertical axis to co-align with a path of egress below (see Applicant's U.S. patent application Ser. No. 18/653,762, filed May 2, 2024).

Building and/or fire code mandates that the conductors for egress light sources are to be encased in a protective armored material. These egress light sources' conductors that are encased by the armored material can co-extend with at least ambient lighting conductors. The conductors' allowable voltage rating or, when used in modular wiring, the modular wiring system's allowable rating is defined by code. The code mandates that all conductors' ratings shall be no less than the highest allowable rated conductor and that the combined loads of the circuits does not exceed the rated allowable assembly voltage.

With rising labor and material costs today, placing egress lighting conductors in the same conduit of ambient lighting is desirable. The egress light conductor/s and the ambient lighting conductor/s are isolated from one another while cohabitating inside a single conduit, and are dedicated to the light sources that perform different illumination tasks. In the US, the egress light source is code mandated to maintain code compliant light levels over path of egress for at least 90 minutes.

When the egress light source is powered by remote power, a distance separates the light emitting element from its dedicated power source. As recognized by the present inventor, unless a testing and reporting/alerting module coupled to the egress light source continuously receives power from the remote power source, the testing and reporting/alerting module is of no value unless the resulting electrical structure adequately provides a solution that satisfies the following questions:

a. How does one know if there is a power disconnect between the remote power source and the luminaire retaining the egress light source?

b. How does one know if at least one of the egress light sources, the egress light driver, a processor, and a sensing device, a power generating device, a short-term power supply, and a communication device on board a luminaire fail?

c. How does one know if the ambient lighting luminaire operates?

The present application describes and shows various approaches that resolve the above challenges raised by these questions. The proposed solutions present a new paradigm to building electrical design focusing on remote power supply such as inverters to power egress lighting. With growing power density and devices reduced form, the Applicant expects significant demand growth for mini-inverters in the coming decade driven by a need for reduced material and labor costs.

SUMMARY

The present innovation can detect and alert of at least four conditions that can prevent a building egress light powered by a remote back-up power supply from turning on when needed. These conditions include:

a. Power disconnects, such as that caused by a broken conductor, between a remote back-up power source and an egress light source.

b. At least one of, an egress light source, an egress light driver, a microprocessor with code, a sensing device, a short-term power supply, and a communication device on board the luminaire with the coupled egress light source fail.

c. An ambient lighting luminaire that is supposed to energize an emergency light source short-term power supply on board fails.

d. At least two of the above conditions occur either simultaneously or independent of each other.

Detection and notifications described herein are available as an option in any of the disclosed embodiments. An indication of the detections and notifications can be displayed with a specific address of a device location as the device relates to a digital map. It also can provide and optionally display an alert (including an address) regarding failure of a specific subcomponent.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
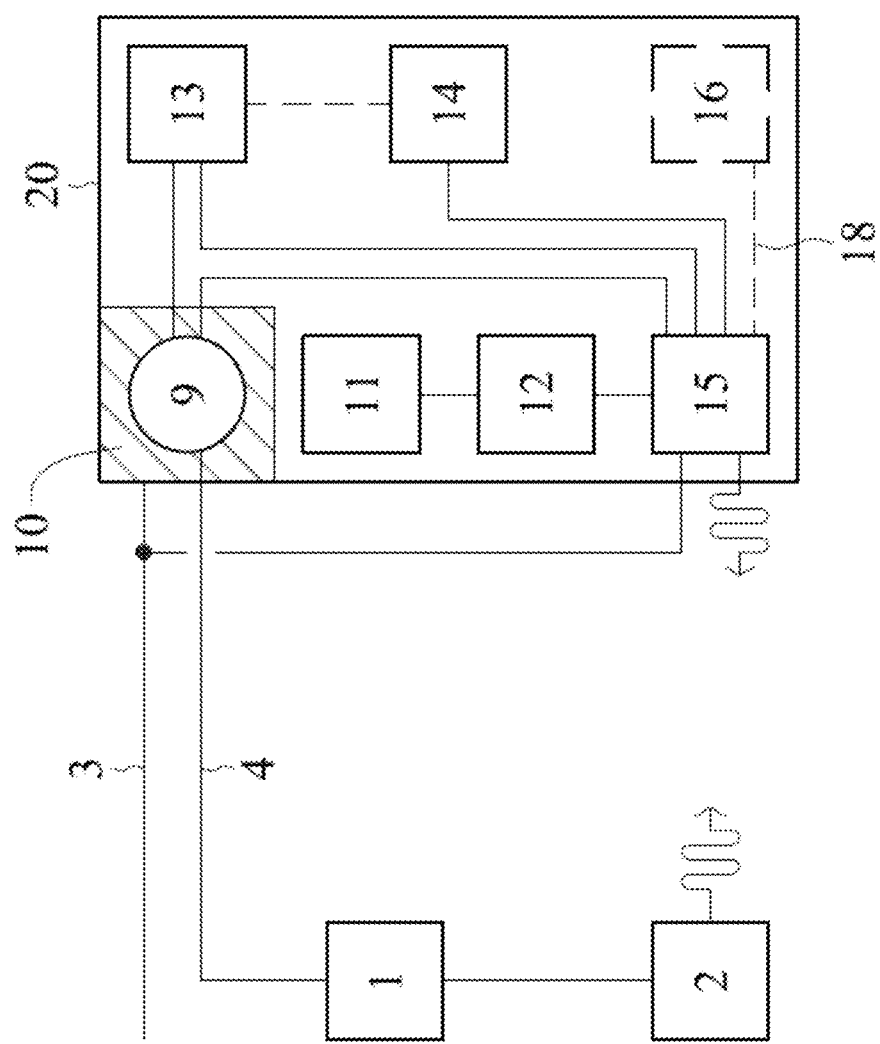
FIG. 1 is a diagram of a power and monitoring system for an ambient light source, with built in test capabilities for monitoring continuously available power and functionality of an egress light source.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Before turning to the detailed drawings, an overview of components used in exemplary systems described herein, as well as their functionality, is first described.

The present innovation is configured to prevent a building egress lighting failure due to the conditions described above by testing the system's operational conditions and alerting of failures. Notably different from systems where there is constant power between the remote power supply and the egress light source with a switching device in proximity to the egress light source, the conductors of the present egress lighting system can be either be under constant load or not under constant load.

The present system introduces at least one of an operational self-testing module (built-in-test module) and an alerting module, which reports a detected failure. Self-testing and the alerting modules requires power to operate; however, the power and the duration needed to operate these modules is significantly less than the power required to operate the egress light source. The present innovation's power to operate the testing and alerting modules is harvested from an ambient lighting luminaire that at least one egress light source is coupled to or mounted in proximity to. Thus, the power is locally generated and locally maintained for use in built-in-test operations.

The present innovation enables an individual standalone egress light source luminaire and/or an egress light's light source coupled to an ambient lighting luminaire to independently power onboard self-testing and alerting module/s. The onboard testing and alerting module/s' power can be generated by capturing radiant photonic energy generated by an onboard ambient lighting light source and/or light from other sources (e.g., an adjacent luminaire). The ambient light source can also be in the proximity of the egress light source. Other power generation methods can alternatively be used including induction and direct power storage from the ambient lighting power supply.

The proceeding example describes the use of photovoltaic cell/s to generate the modules' power.

The photovoltaic cell can couple to a surface of an ambient lighting luminaire and/or extend from a surface ambient lighting luminaire. The egress light source can couple to the same ambient lighting luminaire or can be in the vicinity of this ambient lighting luminaire. The photovoltaic cell's surface area directly or indirectly facing the luminaire's ambient lighting light source can be sized to generate sufficient power to operate at least one of a testing and a reporting/alerting module. The modules' functionality and ability to communicate the operational condition diagnostics can vary among different models and each model may have different power demands. Nonetheless, all modules are configured to discern the operational readiness of the egress light source and communicate at least once sensed failure to a remote client.

It is noted that each standalone egress light source is a kind of "slave" luminaire, and thus be identified by an ID of the ambient luminaire as its host. Alternatively, the egress light source coupled to an ambient lighting luminaire can have a unique address that can be associated with a digital lighting reflected ceiling plan and/or a floor plan. It is also noted that the reporting/alerting module can be as basic as generating an audio output alert and/or visual output upon sensing a failure, or with the more advanced diagnostic tool, can communicate by wire or wirelessly to at least one remote client at least one of, the specific luminaire location where the failure occurred, identify the root failure cause, the failed part/s code, the repair action required, the repair priority, and the go-to contact responsible for making the repair.

The power generated by the at least one luminaire onboard power generating source is stored by means of at least one of, a capacitor bank, a short-term battery, and/or a solid-state storage device configured to store power effectively. The power storage device can be configured to store sufficient power to operate at least one of, the egress light source, a microprocessor with or without a microswitch, a communication device, and at least one other sensing device such as a speaker. The functionality of at least one of the above-described devices is contingent upon at least onboard power availability. For example, when the egress lighting system powered by a remote source is under constant load, the testing and alerting modules can partially or fully rely on remote power. Conversely, when the egress light source power conductors are not under constant load, some or all the devices can be powered by locally generated power.

In yet a different configuration, the operation of the testing module and the reporting/alerting module can be configured to operate in unison with one another, wherein power generated locally is used to power certain operational aspects of the testing, reporting, and alerting in accordance with a schedule, while the same or other operational aspects of the testing, reporting and alerting are relegated to power received from a remote source. The conductors of the power received at the luminaire's egress light source can be under continuous load or under the no load until prompted manually or by control code.

The local self-power generating non-addressable egress light source testing and alerting module is the system's most basic means of communicating a fault. The messaging is conveyed by a sensory device output that is received by a building occupant. The fault detection circuit can be limited to at least one of, a photovoltaic cell, a short-term power storage device, a driver, a microprocessor, a first egress light source, and a second sensory device. The second sensory device can be a light source and a speaker. The use of an auditory output device is recommended where building space is obstructed by floor or ceiling suspended obstructions.

At least one circuit configured for testing and alerting a building occupant can operate as follows. Upon reaching a power storage device loading threshold, a testing cycle can commence. Once the cycle begins, power from the power storage device flows through the driver to the light source. If the level of the resistive load is sensed, no further action be taken until the next test cycle. However, if the sensed level deviates from the expected level by more than a predetermined amount (e.g., 10%), the second sensory device is activated. For example, an auditory device can then broadcast an auditory sound that will alert a building occupant to the specific location of the faulty egress light device. The testing cycle can also be triggered by a schedule and/or ignition cycle of an onboard ambient lighting device or any other testing pro-active trigger.

While this basic configuration does not identify the fault's cause and action required to remedy the issue/s, it establishes without dependence on remote power that a fault exists and associates the fault with a specific location within a building, a location that can have a specific address. A more sophisticated version of the above base model configuration can include at least one microprocessor with code and one or more circuits that are configured to provide more granular detection to enable identifying the specific onboard device/s that failed.

The microprocessor is configured by its execution of stored code to test each of the devices alone and/or in unison. When a fault condition is sensed, at least one sound emitting device can broadcast the fault code by sequencing recognizable sound. In addition, at least one indicator LED light source can be turned on, change color and modulate the power output, and/or ignition sequence to alert a failure or alert and identify the nature of the failure.

The duration of the sound broadcasting and/or the LED indicator signal emitted is contingent on the onboard short-term power storage device capacity, the number of devices to be tested, and the power requirement of each tested device, the microprocessor and the output device/s. In at least one embodiment a plurality of power storage devices can be coupled to an ambient lighting luminaire wherein at least one of the plurality of power storage devices is dedicated to at least one power consuming device coupled to the ambient lighting luminaire or to a housing of an egress light luminaire "slave" that is powered from the ambient lighting luminaire.

The local self-powered generating addressable egress light source testing and alerting modules—The self-powered testing module described above can include an RF communication module. The communication module includes a transceiver that transmits, or transmit and receives, signals from at least one remote client. At minimum, a status signal sent from the RF communication module can be configured to communicate to a remote client a digital fault code. The signals can be conveyed by any of a variety of wireless protocols such as BlueTooth, Zigbee, WiFi, WLAN, or any other secured RF signal communication protocol. The signal can be conveyed by wire and/or wirelessly directly or indirectly to a building environmental systems controller. In at least one same or different embodiment, the controller can be the remote power source controller of egress lighting.

The addressable testing and reporting/alerting modules of the egress light source can be configured to couple to a plurality of sensory devices that can also monitor the environment where the egress light source is located for occupant safety and security. Coupled to a code driven processor, the monitoring can be continuous or intermittent at least when the power used is generated by an onboard ambient lighting luminaire. The code can include at least one AI algorithm that is configured to minimize power usage by applying logic to environmental input received.

Further, when mesh network communication is used (e.g., IEEE 802.11s), the strength of the signal transmitted can be weak as the signal between one luminaire with an egress light source and another does not need to travel far. The present innovation's communication module can send at least one signal to a remote client directly, via a meshed network, directly to a relay that communicates with a remote client, or via meshed network that transmits by relay the signal to the remote client. The signal transmitted from the testing and reporting/alerting modules of the ambient luminaire with an egress light source or the standalone egress luminaire can be as detailed as required and can be supported by the limited power storage available onboard.

FIG. 1 is a diagram of a power and monitoring system for an ambient light source 10, with BIT capabilities for monitoring continuously available power and functionality of an egress light source 9 included as part of the ambient light source 10, or attachable to the ambient light source 10. The ambient light source 10 receives power from a house power conductor 3 (conductor in this context means one or more wires that deliver electricity used for powering a device), which provides general power for operating all of the components of the ambient light source 10. The present embodiment shows house power also being received by the processor. The processer is configured to discern the power source and where applies include a stepdown transformer. The egress light source 9 also receives power from a remote power source 1 that is connected to a communications module 2 which engages in wireless communications with a processor-based controller 15 (e.g., processor circuitry that is configured by execution of software code) having a wireless communication capability. Inside the ambient light source 10, a BIT module 13 (built-in-testing circuitry) performs different status tests on the egress light source 9, power conductors, etc., as will be discussed in more detail later. The BIT module 13 is connected to a reporting/alerting module 14 (reporting/alerting circuitry) which provides the processor/controller 15 with the information needed for the processor/controller 15 to generate a status message that includes an ID of the light source, as well as any error code or fault code that identifies the nature of a detected problem with one or more components. Also, the reporting/alerting module 14 may generate the information for an optical and/or auditory alert produced by a sensory output device 16 so a person in the vicinity of the ambient light source 10 will be made aware of the problem via an audio and/or visual emission. For example, the sensory output device 16 may include a LED (e.g., Red LED that is controllable to flash in different patterns) and speaker.

As will be discussed in greater detail later, the power storage device 12 (power storage circuitry) may include a highly reliable and maintenance free capacitor bank, with an optional battery. The power generation device 11 (power generation circuitry), in this embodiment, is photovoltaic circuitry that collects ambient light and converts it into electricity, which is used to charge the capacitor bank and battery. This self-generation of power is valuable if other power is unavailable via conductors 3 and 4, or there is a physical problem (e.g., cut conductor cable) with the delivery of house power, and backup power from the remote source.

Figure 2:
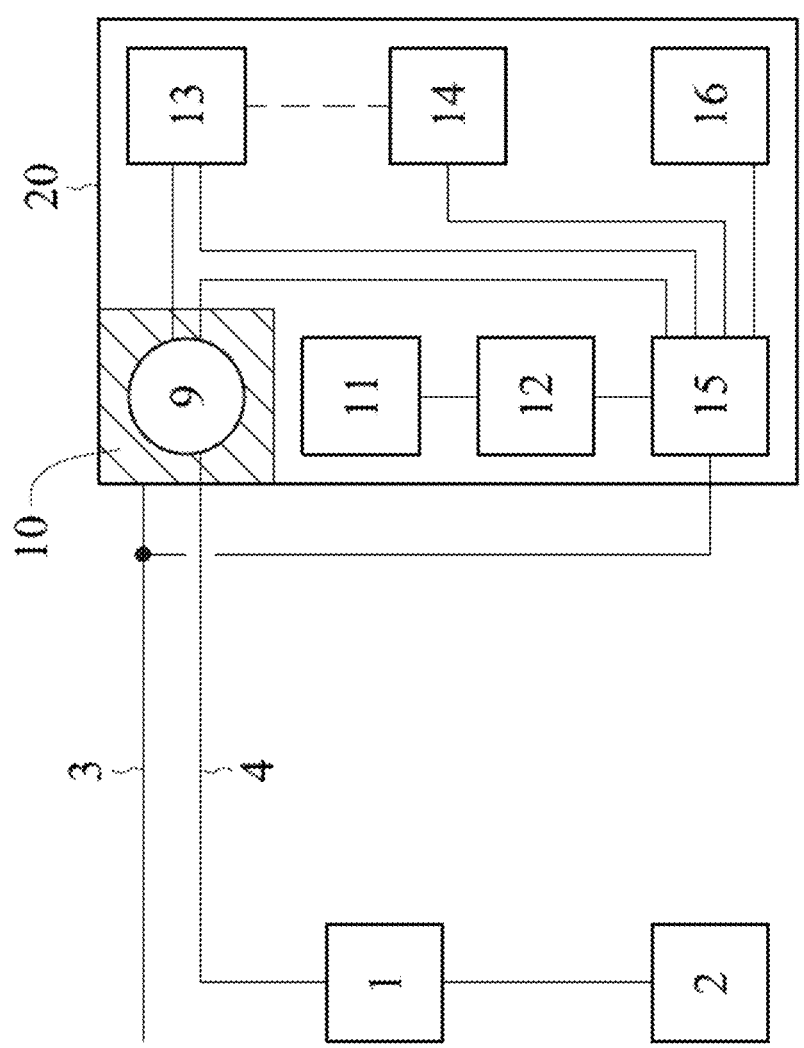
FIG. 2 is a diagram of another embodiment of a power and monitoring system according to the present disclosure.

FIG. 2 is a system diagram of a variation of the system shown in FIG. 1. Instead of wireless communications between the communication module 2 and processor/controller 15, the primary error reporting mechanism is the sensory output device 16. For example, when a fault is detected, a speaker can broadcast an audio signal. The signal can have an audible pattern that an educated car can tell the nature of the fault. No matter what the audio signal communicates, the signal identifies the location of the faulty egress light source device. Similarly, Colored LED indicators can communicate by color, switch on/off, and duration the nature of a fault with an egress lighting device. The testing can be independent of remote testing and occur periodically to discharge at least a portion of the power generated and stored onboard the ambient lighting luminaire.

Figure 3:
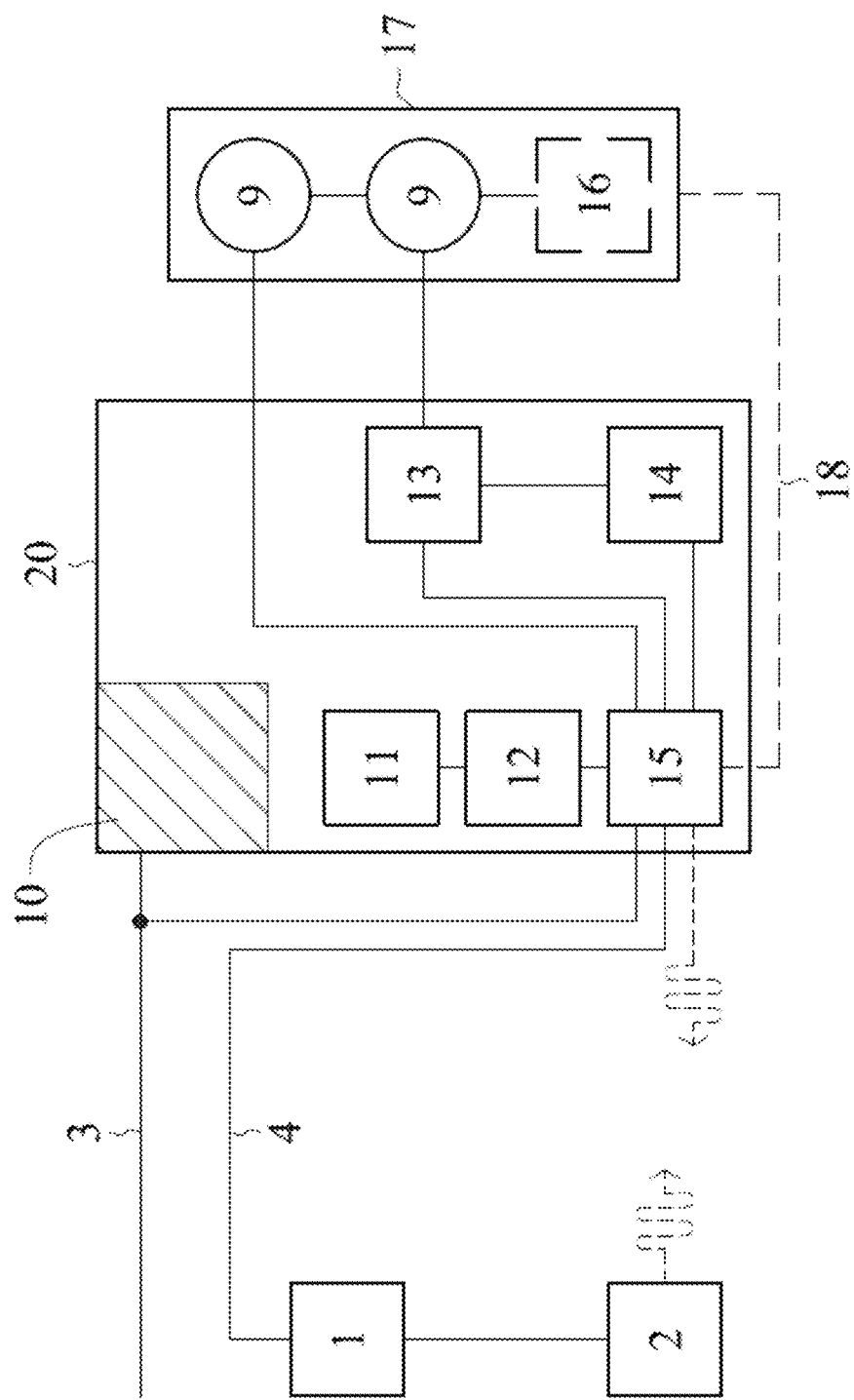
FIG. 3 is a diagram of a further embodiment of a power and monitoring system according the present disclosure.

FIG. 3 is a system diagram of another embodiment that varies from the embodiment of FIG. 1, but the egress light source 9 and sensory output device 16 are optionally contained in a separate housing 17 than the ambient light source 10. The egress light source and sensory output device 16 may be connected directly or via a wireless communication module to the processor/controller 15. The present embodiment shows power received at the egress light sources 9 from the processor/controller power management module. The egress light sources 9 are communicatively coupled to a BIT module that can be coupled to an alerting and reporting module 14. A sensing output device can be coupled to the separate housing 17. Power and/or signal to the sensing device 16 can be delivered directly from the alerting and reporting module 14 or through the processor/controller 15. The power connectivity, and perhaps data connectivity as well, of the present embodiment to the sensing device is shown in dashed line 18. The devices contained in the separate housing 17 remain in communication with the BIT module 13 via a wired connection, although a wireless connection may be used as well.

Figure 4:
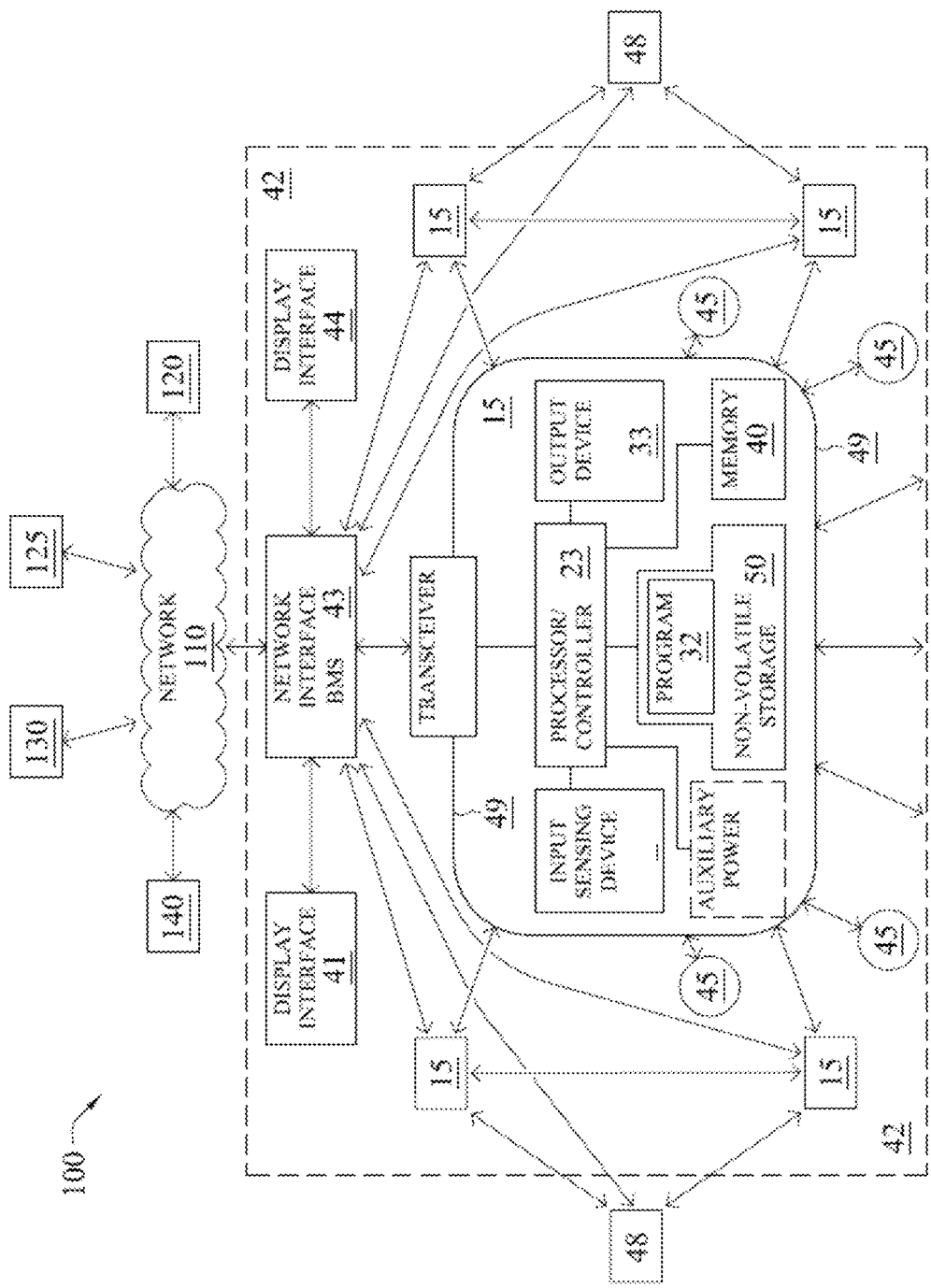
FIG. 4 is a block diagram of a processor/controller (computer processor) that provides control functionality for power control and device monitoring according to disclosed embodiments.

FIG. 4 is a block diagram of a processor/controller (computer)-based network system 100 coupled to an egress light source that may implement the various embodiments described herein in operating the control of the BIT functionality, power monitoring, and fault/status reporting.

FIG. 4 illustrates a control aspect of the present disclosure that may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device (circuitry) from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely autonomously, on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 4 is a functional block diagram illustrating a networked system 100 of one or more networked computers and servers. In an embodiment, the hardware and software environment illustrated in FIG. 4 may provide an exemplary platform for implementation of the software and/or methods according to the present disclosure.

Referring to FIG. 4, a networked system 100 may include, but is not limited to luminaire 15 (which includes computer circuitry as shown), network 110, remote computer 115, web server 120, cloud storage server 125 and computer server 130. In some embodiments, multiple instances of one or more of the functional blocks illustrated in FIG. 4 may be employed.

Additional detail of the computer circuitry included in each ambient light source 10, in reference to FIG. 1, (or separately in the egress light source 9, if not included as part of the ambient light source 10) is shown in FIG. 4. The functional blocks illustrated within the computer circuitry are provided only to establish exemplary functionality and are not intended to be exhaustive. And while details are not provided for remote computers 140, web server 120, cloud storage server 125 and computer server 130, these other computers and devices may include similar functionality to that shown for the computer.

The circuitry may be any programmable electronic device capable of communicating with other devices on network 110. The circuitry of luminaire may include processor 23, bus 49, memory 40, non-volatile storage 50 with auxiliary power storage 9, network interface 43, peripheral interface 44 and display interface 41. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Computer processor 23 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 49 may be a proprietary or industry standard high-speed parallel or serial peripheral interconnect bus, such as ISA, PCI, PCI Express (PCI-e), AGP, and the like.

Memory 40 and non-volatile storage 50 may be computer-readable storage media. Memory 40 may include any suitable volatile storage devices such as Dynamic Random Access Memory (DRAM) and Static Random Access Memory (SRAM). Non-volatile storage 50 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 32 may be a collection of machine readable instructions (code) and/or data that is stored in non-volatile storage 50 and is used to create, manage and control certain software functions that are discussed in detail elsewhere in the present disclosure and illustrated in the drawings. In some embodiments, memory 40 may be considerably faster than non-volatile storage 50. In such embodiments, program 32 may be transferred from non-volatile storage 50 to memory 40 prior to execution by processor 23. Two of the software functions are described in the flowcharts of FIGS. 7 and 8, as will be discussed later.

The computer may be capable of communicating and interacting with other computers via network 110 through network interface 43. Network 110 may be, for example, a local area network (LAN), a wide area network (WAN) such as the Internet, or a combination of the two, and may include wired, wireless, or fiber optic connections. In general, network 110 can be any combination of connections and protocols that support communications between two or more computers and related devices.

Peripheral interface 44 may allow for input and output of data with other devices that may be connected locally with the computer. For example, peripheral interface 44 may provide a connection to external devices. External devices may include devices such as a keyboard, a mouse, a keypad, a touch screen, and/or other suitable input devices. External devices may also include portable computer-readable storage media such as, for example, thumb drives, portable optical or magnetic disks, and memory cards. Software and data used to practice embodiments of the present disclosure, for example, program 32, may be stored on an egress luminaire such portable computer-readable storage media. In such embodiments, software may be loaded onto non-volatile storage 50 or, alternatively, directly into memory 40 via peripheral interface 44. Peripheral interface 44 may use an industry standard connection, such as RS-232 or Universal Serial Bus (USB), to connect with external devices.

Display interface 41 may connect the computer to a remote display. The remote display may be used, in some embodiments, to present a command line or graphical user interface to a user of computer. Display interface 41 may connect to the display using one or more proprietary or industry standard connections, such as VGA, DVI, DisplayPort and HDMI.

As described above, network interface 43, provides for communications with other computing and storage systems or devices external to the computer. Software programs and data discussed herein may be downloaded from, for example, a remote computer, a web server 120, a cloud storage server 125 and a computer server 130 to non-volatile storage 50 through network interface 43 and network 110. Furthermore, the systems and methods described in this disclosure may be executed by one or more computers connected to the computer through network interface 43 and network 110. For example, in some embodiments the systems and methods described in this disclosure may be executed by remote computer 115, computer server 130, or a combination of the interconnected computers on network 110.

Data, datasets and/or databases employed in embodiments of the systems and methods described in this disclosure may be stored and or downloaded from remote computer 115, web server 120, cloud storage server 125 and computer server 130.

FIG. 4 further shows a diagram of the building means of egress device connectivity. The present embodiment shows the entire device network 100 of the building means of egress constructed with as few as two communicatively coupled egress luminaires having controllers 15. For this reason, a controller/processor 15 for a luminaire is shown at the center of the present block diagram. The controller/processor may include a processor/controller 23 (computer processor), an input sensing device, an output device 33, a transceiver, and an auxiliary back-up power supply.

The controller/processor 15 for a luminaire is disposed inside a building interior 42. Inside the building, the egress luminaire is in communication with at least one more controller/processor 15 for a luminaire and may also be communicatively coupled to at least one other building discipline device 45. In addition, at least one controller/processor 15 for a luminaire can be communicatively coupled to at least one exterior mounted device 48.

The network interface 43 can be communicatively coupled to the cloud network 110 and through this network, can be communicatively coupled to at least one of: a remote computer, a web server 120, a cloud storage server 125, and a computer server 130.

The remote power source 1 (FIG. 1) transmits power to egress light sources downstream only when house power is interrupted (or during testing) and can be programmed to test the power connectivity to the egress lighting light sources on a routine basis. Each testing module at the egress light source can be configured to identify a failure by light source location and/or address. The means to identify a failed light source location can be by at least one of a local sensory output and a signal communicated to at least one remote client.

At least one device that powers the testing and reporting/alerting modules receives power that has been generated by an onboard ambient lighting light source. Most importantly, the reporting/alerting module coupled to the egress light source can be configured to alert at least one client when power connectivity from the remote power supply to the egress light source is lost.

In at least one power distribution configuration, the conductors delivering power from the remote power source to the egress light source can be under load. In such a power distribution configuration, microswitch/es onboard the luminaire can turn the egress light source on and off. The microswitch can be controlled by an onboard processor controller and/or by a remote processor controller via a transmitted signal. When house power is interrupted or during a test cycle, at least one remote controller (a master controller) directs at least one addressable egress light source to turn on. If the light source does not turn on, a signal is communicated back to the at least one of the controller initiating the test and at least one additional client.

It is noted that even though the power distribution configuration described above maintains constant power to the egress light source, it is conceivable that power connectivity between the remote power source and the egress light source can be disrupted, and a self-powered onboard reporting/alerting module is needed to report the disconnection.

Finally, the egress light sources are located over the main circulation paths within a building. The present egress lighting system receiving power from remote back-up power source can provide other utility by at least operating as a building night light. The egress lighting controller can enable the flow of house power to at least one egress light source when house power is available. The house power bypasses the back-up power source. When house power is interrupted, the egress lighting controller switches to the back-up power source. The controller can also direct the egress light sources to dim. However, when house power is interrupted, the egress light source are re-set to full output.

Figure 5:
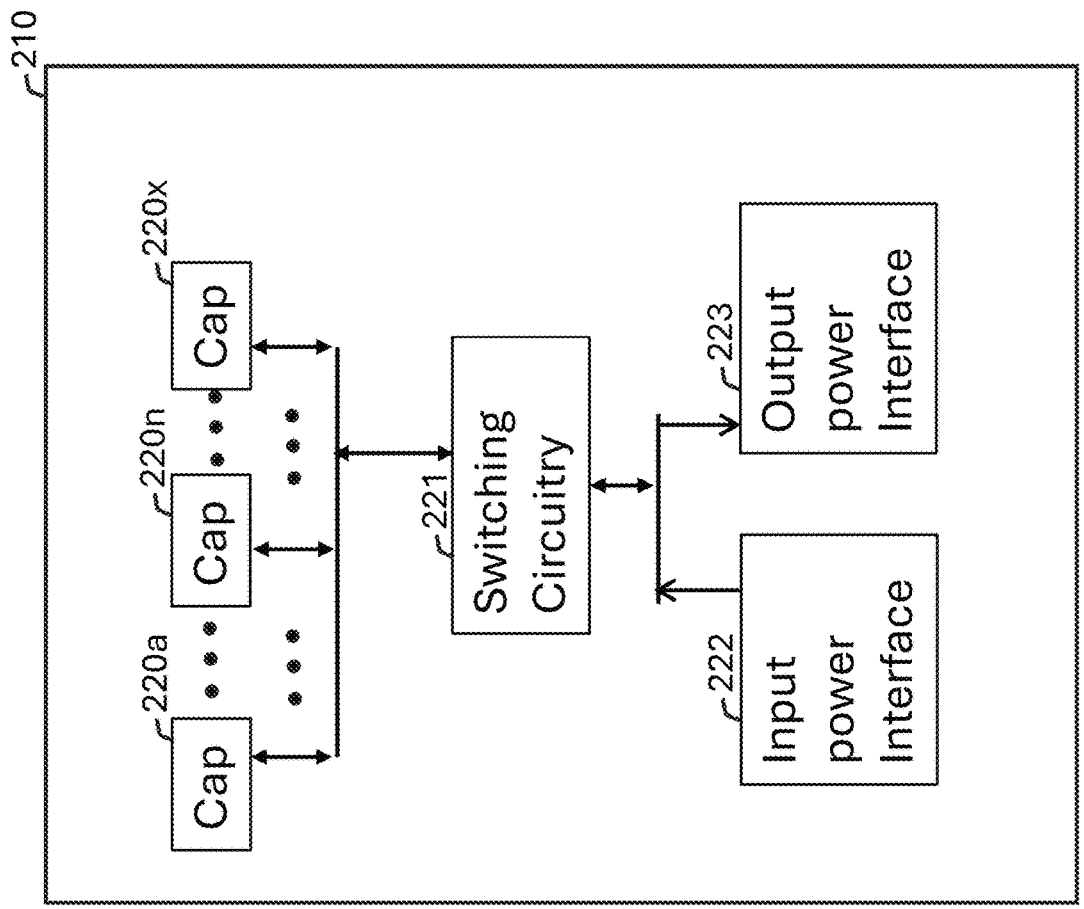
FIG. 5 is a diagram of a capacitor bank that includes a plurality of capacitors that provide a local power source for providing continuous monitoring, reporting and operating of built-in-test (BIT) circuitry even in the event of primary power disconnection, or other source of power outage, or device failure.

FIG. 5 is a capacitor bank 210 that is used as a local backup power source and is designed to store electrical energy temporarily and released when needed. The capacitor bank 210 includes a plurality of capacitors 220a to 220x, with perhaps only a fraction of them used at one time (e.g., 220a to 220n), while the others used as on-board spares, or are switched in when extra capacity is needed.

The physically and electrical sizing of the capacitor bank may be adjusted according to the circuit demands, and may be set according to the equation $E=P \times t$, where E is the energy in joules (J) needed to supply the power for the specified time, P is the average power in watts (W) that the capacitor bank needs to provide, and t is the duration in seconds(s) for which the capacitor bank needs to supply this power. For typical egress lights, the power consumption is roughly 6 W each, and 24 W for 4 of such lights and related circuitry such as drivers, switching circuitry, processors, etc. Thus, to provide 24 watts of power for at least 1 second, $E=24\text{ W} \times 1\text{ s}=24$ joules (J). The capacitance (C) needed to store this energy can be found using the formula: $C=(2 \times E)/V^2$, where C is the capacitance in farads (F), E is the energy in joules (J), and V is the voltage rating of the capacitors. Thus, at 100V, $C=(2 \times 24\text{ J})/(100\text{ V})^2$, or 0.0048 F, which is 4,800 μF.

In terms of the physical sizes of the capacitors to provide 4,800 μF, various formats may be used. For example, 1,000 μF electrolytic capacitors are about 0.75 inches in diameter, and 1 inch in length. When 6 all are arranged in a 2×3 grid on a single side of a PCB, the combined capacitance is 6,000 μF, and the footprint and volume of the capacitor bank is roughly 1.5"×2.25"×1".

On the other hand, only 1,200 μF of capacitance is sufficient to support 0.25 seconds of illumination of the egress light's LEDs and drivers, which can be supported by 12 100 μF electrolytic capacitors at 100 V. Each 100 μF typically is 0.4 inches in diameter and less than 0.9 inches in height. When all are arranged in a 4×3 grid on a single side of a PCB, the footprint and volume of the capacitor bank is roughly 1.6"×1.2"×0.9". If mounted on both sides of the PCB in two 2×3 grids, the size is roughly 0.8"×1.2"×1.8".

The above configurations are merely exemplary, and different timings (e.g., 1/10 of a second), and different sized capacitors may be used according to these teachings so that enough light is emitted for a sufficiently long period of time that a remote sensor can detect the level of output light. Alternatively, or complementarily, the drive currents may be monitored as a proxy for monitoring the output light from the egress lights.

Figure 9:
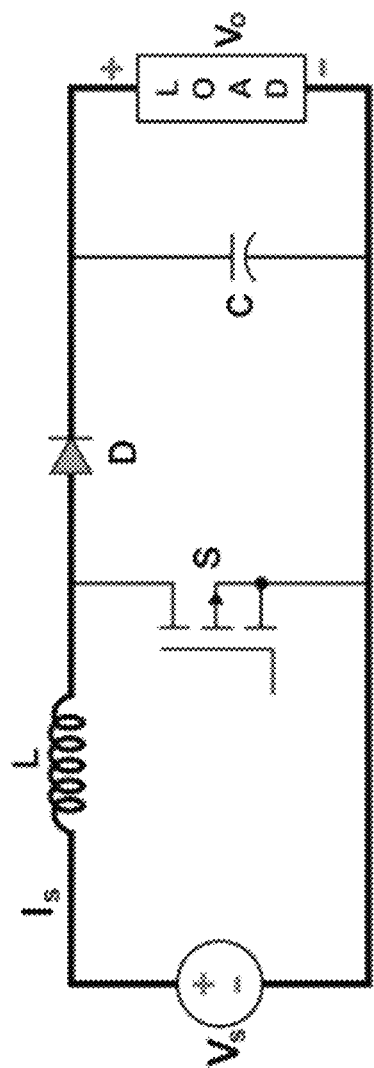
FIG. 9 is a circuit diagram of a boost circuit for boosting a DC level provided from a photovoltaic circuit to a higher DC voltage level, prior to storage in the capacitor bank.

In FIG. 5, the input power interface connects to switching circuitry 221 (which includes control circuitry, such as the boost circuitry of FIG. 9). The switching circuitry 221 includes controllable switches (e.g., semiconductor switches and/or relays) that are used to connect and disconnect the capacitor bank from other circuitry that serves as a load (e.g., the LEDs and drivers). This control circuitry can be discrete circuitry or programmable circuitry for controlling the switching operations and monitoring the voltage levels on the capacitors.

During a charging operation, the switching circuitry 221 connects the capacitors 220a-220n to a power source (e.g., photovoltaic circuitry, and/or inductive circuitry that parasitically draws power from the primary or back up power lines) to charge the capacitor bank via a trickle charger that regulates the charging current to prevent overcharging and ensure the capacitors reach their intended voltage safely and efficiently.

During discharging, the switching circuitry (which may be implemented by the processor) rapidly activates the switches to allow charge stored in the capacitors 220a-220n to drive other circuitry (as a load). The switching circuitry 221 includes a microcontroller that controls the charging based on inputs from sensors and user-defined parameters. This control logic manages, timing, protection, and efficiency. The timing determines when to switch between charging and discharging modes based on system demands and energy storage levels. The microcontroller monitors voltage levels to prevent overcharging or over-discharging, which can extend the lifespan of the capacitors and ensure safe operation. The efficiency optimizes the switching process to minimize energy losses and maximize the efficiency of energy transfer from the power source to the load.

Figure 6:
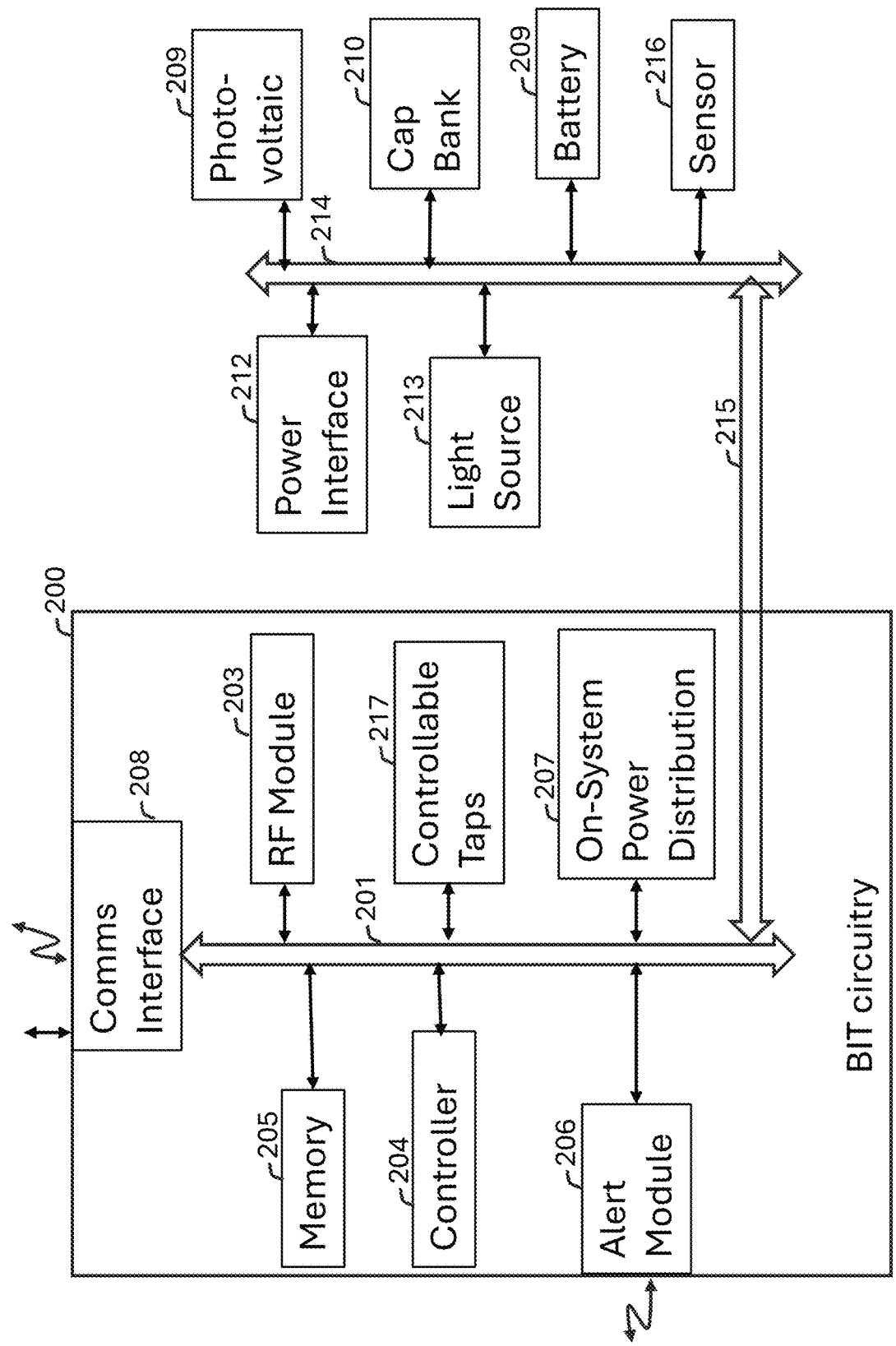
FIG. 6 is another block diagram of BIT circuitry according to the present disclosure.

FIG. 6 is a block diagram of the BIT circuitry 200. A bus 201 interconnects various components, including a controller 204, like that described in reference to FIG. 4. The controller 204 may be programmable (e.g., CPU, GPU, or the like), or dedicated circuitry (e.g., ASIC). The controller 204 executes code stored in memory 205 and performs operations like those described later in reference to FIGS. 7 and 8. The controller 204 generates status messages or alert signals to remote and/or peripheral devices regarding BIT results. Moreover, the status message may include an ID of the light source 213 that the BIT circuitry determines is experiencing an error condition, as well as an error code that identifies the nature of the problem. For example under a condition the BIT circuitry 200 determines a power line is disconnected and prevents power from reaching light source 213, the BIT circuitry prepares and sends via the RF module 203 (which contains a wireless transceiver) and communications interface 208 a wireless signal reporting the ID of the light source 213, as well as the error codes (e.g., disconnection, and failure to generate light). This way, the message can be received by a remote computer that monitors the conditions of the lighting network, and can dispatch a repair message for someone to repair the light. The BIT circuitry 200 may also issue a message over a wired communication channel if one exists. Likewise, the controller 204 can prepare an optical and/or auditory alert via alert module 206.

The controller 204 also controls controllable conductivity taps 217 that allow for isolated conductivity taps points between different components shown in FIGS. 1-2 and 6. On-system power distribution circuitry 207 operates under control of the controller 204 and under a condition primary power is detected as being absent, or the BIT circuitry 200 operates a BIT routine, the on-system power distribution system 207 switches in/out power sources to the components under test, or in the case of back-up power, providing backup power from a secondary source such as the battery 209 for back up operation. A power/data interconnect bus 215 interconnects the bus 201 on the BIT circuitry 200 with a power/data bus 214, which is external to the BIT circuitry 200. The power/data bus 214 connects to a power interface 212, which provides primary power to the egress light source 213. However, in the event primary power is unavailable, the testing of the egress lights may continue to be checked while being powered from the capacitor bank 210. A photovoltaic device 209 converts ambient light during normal operations into electricity that is used to keep the capacitor bank 210 charged, as well as the battery 209 charged. An optical sensor is positioned to receive light emitted from the egress light source 213 during a BIT test of the light emitted from the light source 213. If the light is below a predetermined level (e.g., 80% of an expected light level), the detection signal from the sensor 216 is provided to the controller 216, which issues a status message with the ID and error code.

The built-in-test (BIT) circuitry 200 is designed to test the functionality of the subcomponents and especially whether power has been disconnected to a lighting device. It operates with the goal of detecting the absence of electrical power. and signaling this condition to external monitoring systems. For present power detection, the BIT circuitry is integrated within the lighting device and continuously monitors the presence of electrical power supplied to it. The BIT circuitry includes voltage sensors or current detectors that measure the voltage level at the input terminals of the lighting device, or current flow through the device. However, if the power line is not energized, the BIT circuitry includes conductors or probes that are in contact with the non-energized power line. These components are used to sense the continuity of the lines. When the non-energized power line is intact and connected, there is typically a low resistance path between the conductors or probes. The BIT circuitry can measure this resistance to confirm continuity. The circuitry is set to detect a specific resistance threshold that indicates the presence or absence of continuity in the line. For example, a very high resistance (indicating an open circuit) would suggest that the line has been disconnected. Upon detecting a resistance above the threshold level (indicating an open circuit), the BIT circuitry generates a signal or changes its state to indicate a disconnection condition. Similar to power loss detection, the BIT circuitry may activate an indicator such as an LED indicator light or send a signal to a monitoring system. This alerts maintenance personnel or users that the non-energized power line has been disconnected. Moreover, the BIT circuitry communicates (wirelessly, via a wired connection, of via an optical or audible signal) with centralized control systems or building management systems (BMS), or even a human who can hear and see the fault condition. It can report the fault condition, enabling proactive maintenance and troubleshooting.

Figure 7:
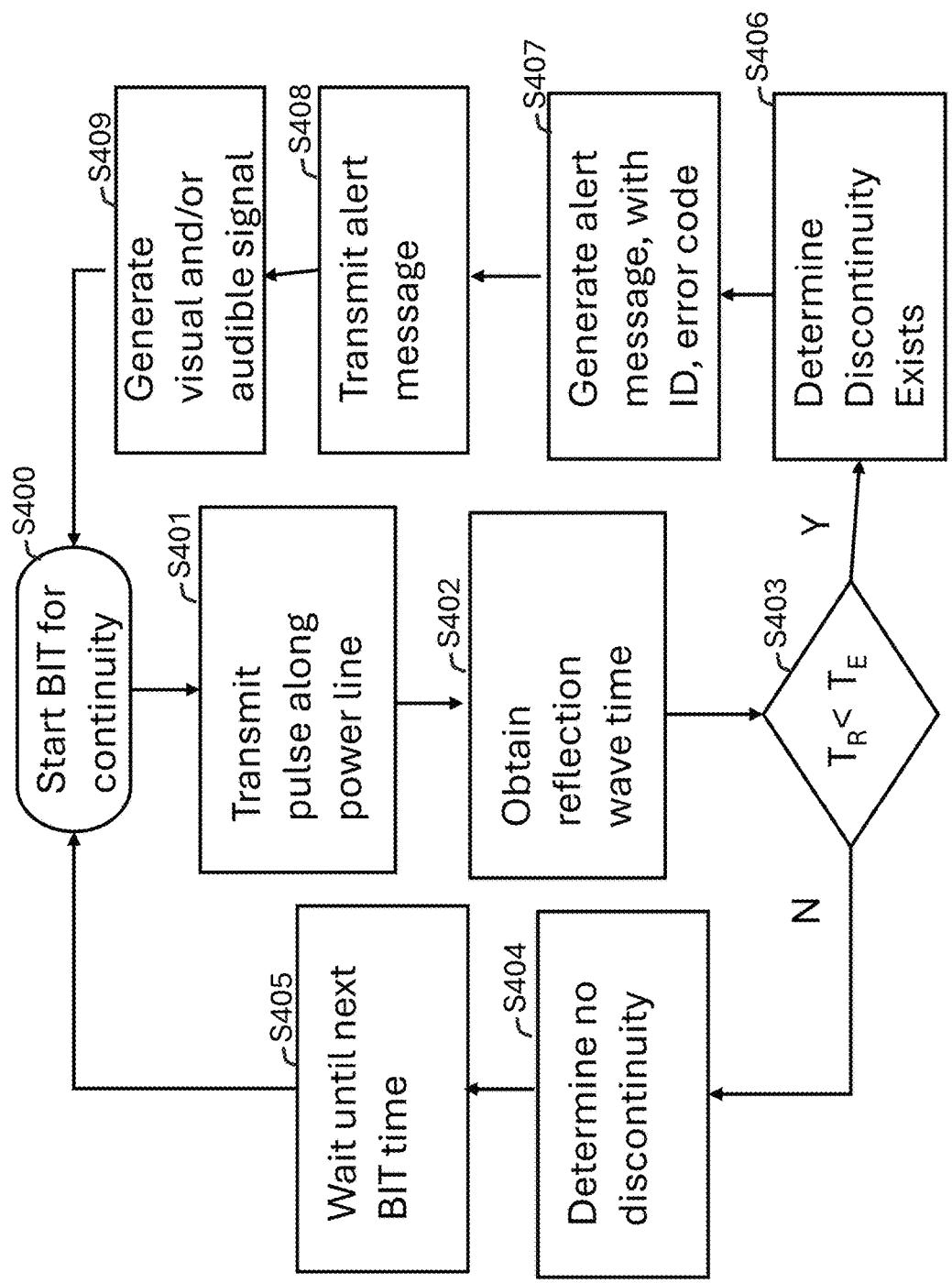
FIG. 7 is a flowchart of a BIT process to monitor for discontinuities in power, or electrical conductivity, in the power conductors that deliver power to the egress light source.

FIG. 7 is a flowchart of a continuity BIT process performed by the controller 204 and associated circuitry previously described. Prior to performing this continuity BIT process, the BIT circuitry checks for whether the backup power is reliably provided via backup power conductor 4 (see FIG. 1). Moreover, the BIT circuitry 200 (FIG. 6) performs periodic voltage checking processes where a voltage potential is measured on line 4 with respect to ground, and if backup power is applied at a predetermined voltage level, then the BIT circuitry 200 concludes the backup power is working sufficiently well. An optional current check may be performed as well. In some situations, the power may not be applied and there is a question about whether the conductor 4 is intact. In some situations, the conductor 4 may be provided with a ground wire in addition to a conductor wire and so a conductivity test (by taking a resistance measurement via the controllable taps 217 that connect to the conductor 4 and ground wire) can be performed to see if the conductor remains electrically connected to the remote power source 1 and the egress light source 9. However, if the remote power source 1 is disconnected and there is no ground wire present, the BIT circuitry 200 cannot determine by a conductivity test whether the back-up power conductor 4 has be broken or not. In this case, the BIT circuitry 200 performs a time domain reflectometer (TDR) test.

Moreover, the BIT circuitry 200 is equipped to detect a break in the power line 4 via its generation of a signal (e.g., pulsed waveform) that is sent down the power line 4. When the signal encounters an open circuit or discontinuity in the line, a portion of the signal reflects backward towards the source due to a lack of termination. The reflected signal carries information about the impedance of the line or circuit at the point of discontinuity. By analyzing the amplitude, phase, and timing characteristics of the reflected signal, the controller 204 can deduce the presence of an open circuit. The BIT circuitry employs a TDR to send short pulses down the power line 4, and measure the reflection time to return. An open circuit (e.g., a cut power line) appears as a sudden spike in the reflected signal. Based on the analysis of the reflected signal, the BIT circuitry generates an alert signal (with information such as an address of the device and an error code) to trigger a maintenance action. In turn, this allows for proactive maintenance by detecting potential issues before they lead to complete failure.

FIG. 7 is a flowchart of a BIT for continuity on the back up power line 4. The process begins at S400 and the controller 204 generates a pulse that it provides to power interface 212 (FIG. 6) to apply to power conductor 4 (FIG. 1). The controller 204 observes a time delay before a reflection is received. In step S403 the controller checks whether the received time TR time is less than an expected time TE. If the result of the inquiry is negative, the process proceeds to step S404 where the controller determines there is no discontinuity, and then after waiting for another time (e.g., 1 hour) in step S405, the process returns to step S400 where another BIT continuity test is performed.

However, if the result of inquiry in step S403 is affirmative, the controller concludes in step S406 that the discontinuity exists and the process proceeds to step S407 where the controller generates an alert message identifying the luminaire for which the test was performed, and an error code that identifies the nature of the detected problem. The alert message is transmitted in step S408 to a remote computer so a maintenance action can be taken to repair the discontinuity. Subsequently in step S409, a visual strobe light and/or an audible signal may be generated so error status may be detected by a person who is in the vicinity of the luminaire. Steps S408 and S409 can be performed in a single processor, or the process can adopt just one of the steps (i.e., either send a wired or wireless message, or generate visual and/or audible signals).

Figure 8:
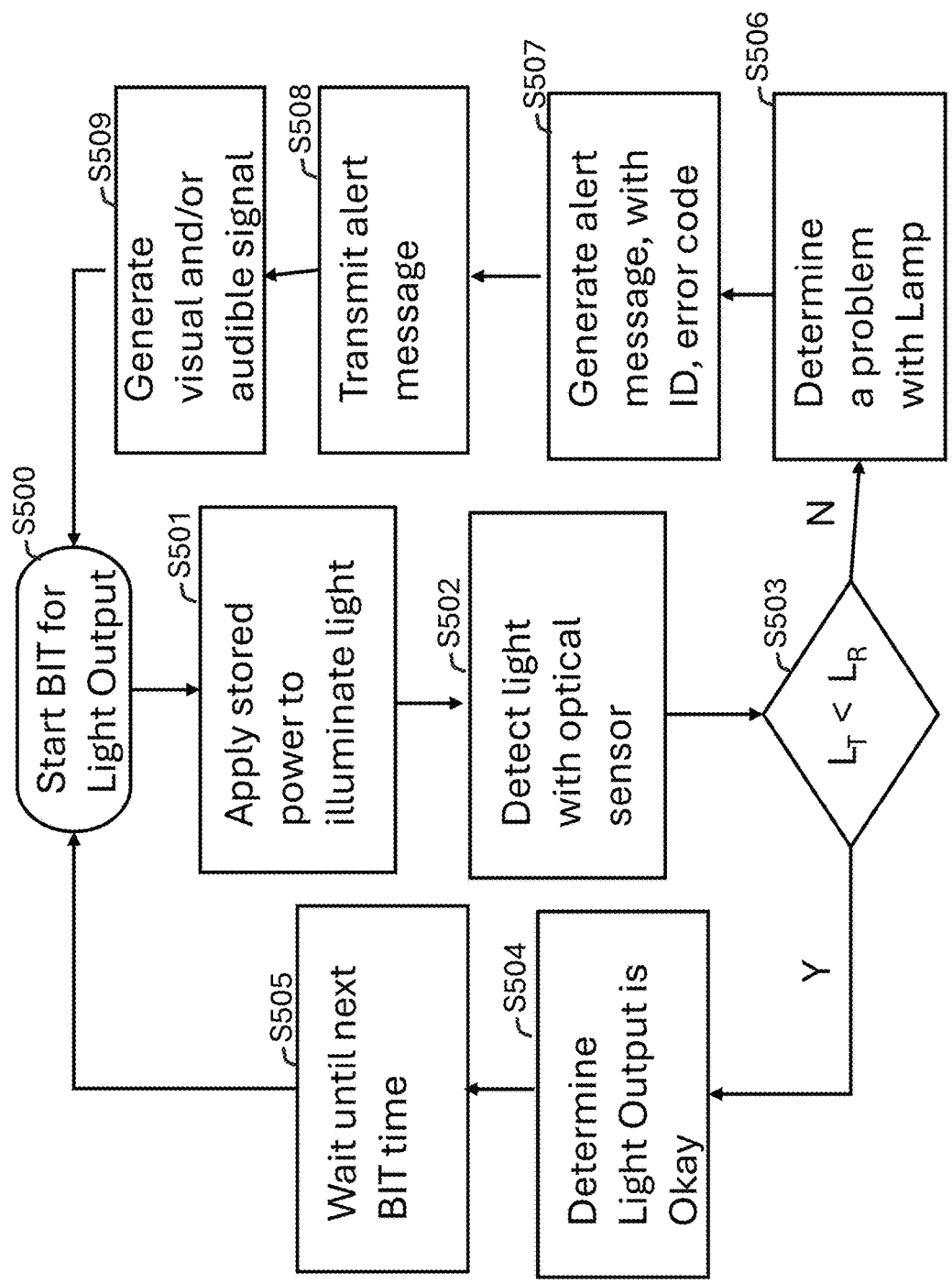
FIG. 8 is a flowchart of a BIT process for determining whether the egress lights are capable of providing sufficient optical energy when the egress lights are used, as well as a reporting capability of the status of the egress lights.

FIG. 8 is a flowchart of a BIT process to detect whether an amount of light coming from the egress light source is sufficient according to its purpose. The process in FIG. 8 detects an amount of light coming from the egress light source. However, a proxy test is optionally performed as well, where a current draw from the capacitor bank is observed and compared with an expected current draw if the lamps in the egress light source is operating properly.

The BIT process in FIG. 8 starts in step S500 and proceeds to step S501 where energy stored in the capacitor bank is applied as a current flow to drive the lamps (e.g., LEDs and drivers) in the egress light source for a predetermined period of time (e.g., 1 second, or ¼ of a second). The light emitted from the lamps is then detected with an optical light sensor in step S502. An inquiry is made in step S503 to determine if the received light LR is greater than a threshold light level LT. If the response to the inquiry in step S503 is affirmative, the process flows to step S504 where the controller makes a determination that the light output is sufficient, and then the process waits in step S505 until the next BIT process is started in S500.

However, if the response to the inquiry in step S503 is negative, in step S506 the controller determines that there is a problem with the egress light source. Subsequently, the controller generates an alert message in step S507 where the message includes an ID of the egress light source that has the low detected light output, and an error code that is associated with the nature of the problem that is experienced. In step S508, the alert message is transmitted (via a wired connection or via wireless) to a remote device so a maintenance action may be taken. Optionally, in step S509 the controller causes a visual and/or audible signal to be generated so a person in the vicinity of the egress light source can be made aware of the problem.

FIG. 9 is a boost converter circuit for boosting the DC power provided from a photovoltaic circuit to a higher voltage held by the capacitor bank. The boost converter, also known as a step-up converter, is a DC-DC converter that increases the input voltage to a higher output voltage. The components of the boost converter include an inductor (L) fed from a voltage source that with a current Is. The inductor L feeds a switch (transistor, S) in parallel, as well as a diode D, in series. A capacitor is placed in parallel with a load over which the output voltage $V_O$ is developed. The operation of the boost converter includes two main stages: On state (switch S closed), and Off state (switch S open). When the switch is closed, current flows through the inductor, causing a magnetic field to build up and storing energy in the inductor. During this period, the diode is reverse-biased (not conducting), and the load is powered by the capacitor. The voltage across the inductor increases linearly over time due to the constant input voltage. When the switch is opened, the inductor's magnetic field collapses, and the energy stored in the inductor is released. The inductor's voltage polarity reverses, and it adds to the input voltage, effectively boosting the voltage. The diode becomes forward-biased, allowing current to flow to the capacitor and the load. The capacitor smooths out the voltage, providing a stable output voltage. The duty cycle of the switch (the ratio of the time the switch is on to the total period) plays a critical role in determining the output voltage. For a high output voltage like 100V from a 10V input, the duty cycle will be high, which in this case is a 90% duty cycle. The relationship is given by:

$$V_O = Vs/(1-D), \text{ and thus } 100 = 10/(1-D) \text{ when } D = 0.9$$

The controller 204 (FIG. 6) can optionally serve as a pulse width modulation (PWM) controller to adjust the duty cycle to maintain a settable output voltage. The PWM controller senses the output voltage $V_O$ and sets the modulation rate of the transistor S accordingly. A feedback loop ensures that the output voltage remains stable despite changes in input voltage or load conditions.

ELEMENT LIST

1. Remote Power Source
2. Communication Module
3. House Power Conductor
4. Back-up Power Conductor
5. Luminaire Housing
6. Slave Unit
7. Master Unit
8. Remote Client
9. Egress Light Source
10. Ambient Light Source
11. Power Generation Device
12. Power Storage Device
13. Testing Module
14. Reporting/Alerting Module
15. Processor/Controller w/Code
16. Sensory Output Device 200 Built-in-Test (BIT) circuitry
17. Separate Housing
18. Power Conductor to Separate Housing
20. Ambient Luminaire Housing
201 Data Bus
202 Power Bus
203 RF Module
204 BIT controller
205 Memory
206 Alert Module
207 On-system Power distribution
208 Communications Interface
209 Photovoltaic Circuitry
210 Capacitor Bank
211 Battery
212 Power Interface
213 Light Source
214 Power Bus
215 Power/data Interconnect
216 Sensor
217 Conductivity Taps Numerous modifications and variations of the aspects of the disclosed subject matter are possible in light of the above disclosure. It is therefore to be understood that within the scope of the appended claims, the disclosure may be practiced otherwise than as specifically described herein.

The invention claimed is:

1. A lighting apparatus comprising:
a power interface configured to receive electrical house-power from a remote power source via electrical conductors dedicated to powering building egress devices;
an egress light source that is connected to the power interface and provides a load on the electrical conductors during a test mode of operation or under a house-power interruption event;
an ambient lighting luminaire having an onboard ambient light source that is coupled to the egress light source and power interface;
an electrical power generation circuitry coupled to the egress light source and the ambient lighting luminaire, the electrical power generation circuitry is configured to generate power via at least one of induction, photonic power conversion, or via direct electrical connectivity to a lighting driver;
power storage circuitry that stores power provided from the electrical power generation circuitry and controllably releases the power stored in the power storage circuitry in the test mode of operation or the house-power interruption event; and
circuitry configured to
implement a built-in-test module that tests components of the lighting apparatus during the test mode of operation,
implement a report/alert module that reports an indication of a status of operation of the lighting apparatus to a remote location, and
control operations of the built-in-test circuitry, generation of the indication of the status of the operation, and switch from house-power to power stored in the power storage circuitry in the test mode of operation or the house-power interruption event.

2. The lighting apparatus of claim 1, wherein at least one of the ambient lighting luminaire or the egress light source is assigned an address that allows for a predetermined message or control signal to be delivered to a device that is assigned the address.

3. The lighting apparatus of claim 1, wherein the ambient lighting luminaire is coupled to at least one other sensory output device that is configured to alert a building occupant.

4. The lighting apparatus of claim 3, wherein the at least one other sensory output device is configured to identify a failed light source in a building in which the ambient lighting luminaire is located.

5. The lighting apparatus of claim 1, wherein the circuitry includes a wired or wireless communication module and programmable circuitry that is configured to generate and transmit the indication of the status of operation as an electronic message.

6. The lighting apparatus of claim 5, wherein the communication module transmits at least one device failure code as part of the electronic message to a remote electronic device.

7. The lighting apparatus of claim 1, wherein the circuitry includes an onboard programmable processor that controls the built-in-test module independently or in coordinate with a remote controller.

8. A lighting apparatus comprising:
a power interface configured to receive electrical house-power from a remote power source via electrical conductors dedicated to powering building egress devices;
an egress light source that is connected to the power interface and provides a load on the electrical conductors at least during a test mode of operation or under a house-power interruption event;
an ambient lighting luminaire having an onboard ambient light source that is coupled to the egress light source and power interface;
electrical power generation circuitry that generates electrical power from energy provided by operation of the ambient lighting luminaire;
power storage circuitry that stores power provided from the electrical power generation circuitry;
communication circuitry that is communicatively coupled to a remote client device and is powered by the power storage circuitry; and
controller circuitry that, under a condition that the egress lighting system is operating in a test mode or when house power is interrupted, is configured to cause the communication circuitry to transmit a message to the remote client about at least one of a failure of a component of the lighting apparatus or a power connectivity failure.

9. The lighting apparatus of claim 8, wherein the egress source light source is a slave egress light source that is in communication electrically with a host ambient light luminaire.

10. The lighting apparatus of claim 9, wherein the circuitry configured to
implement a built-in-test module that tests components of the lighting apparatus during the test mode of operation,
implement a report/alert module that reports an indication of a status of operation of the lighting apparatus to a remote location, and
at least one of the power storage circuitry, the controller circuitry, and the communication circuitry, the built-in-test module, the report/alert module, and the communication circuitry is coupled to the ambient lighting luminaire.

11. The lighting apparatus of claim 8, wherein at least one device coupled to a housing of at least one of the ambient lighting luminaire and the slave egress light source has a digital address that permits addressable digital messages to be exchanged with other devices.

12. The lighting apparatus of claim 8, further comprising at least one of a sound emitting device and an indicator self-illuminating device are coupled to at least one of a housing of the egress light source and the ambient lighting luminaire.

13. The lighting apparatus of claim 12, wherein the at least one of the sound emitting device and the indicator self-illuminating device is configured to identify at least one of a location of a failed egress light source and a nature of a failure of the failed egress light source.

14. The lighting apparatus of claim 8, wherein the controller circuitry and communication circuitry are configured to be powered from the power storage circuitry and communicate at least one indication to a remote client without receipt of remote power.

15. An ambient lighting luminaire comprising:
an onboard ambient light source;
a power interface configured to receive electrical housepower from a remote power source and from a remote back-up power source via electrical conductors that are at least in part conveyed inside a single ridged or flexible armored conduit;
an egress light source that is electrically coupled to the ambient lighting luminaire;
electrical power generation circuitry that generates electrical power from an operation of the ambient lighting luminaire;
power storage circuitry that stores power provided from the electrical power generation circuitry;
processor circuitry; and
communication circuitry that is powered by the power storage circuitry and is controlled by the processor circuitry to communicatively couple selectively to a remote client regarding at least one device failure, a power connectivity failure during egress lighting system test and when house power is interrupted.

16. The ambient light luminaire of claim 15, wherein the processor circuitry is configured to independently report to the remote client about at least one onboard device failure.

17. The ambient light luminaire of claim 15, wherein power from the ambient lighting luminaire is conveyed to an emergency lighting luminaire in a same building.

18. The ambient light luminaire of claim 15, further comprising a testing module, and a reporting module, wherein the testing module, the reporting module, the communication circuitry, the processor circuitry, the electrical power generation circuitry, and the power storage circuitry are at least in part configured to operate independently of and in unison with a remote controller.

19. The ambient light luminaire of claim 15, further comprising a remote power source controller that is configured to select back-up remote power or house power to power the egress light source.

20. The ambient light luminaire of claim 19, wherein the egress light source is dimmable and the remote power source controller is configured to reset a dim mode to a full light source output mode when operating under remote power.

* * * * *